United States Patent [19]

Daumueller

[11] Patent Number: 5,138,533
[45] Date of Patent: Aug. 11, 1992

[54] DEVICE FOR TESTING HEADLIGHT ORIENTATION OF A HEADLIGHT OF A MOTOR VEHICLE

[75] Inventor: Hans Daumueller, Bodelshausen, Fed. Rep. of Germany

[73] Assignee: Robert Bosch GmbH, Stuttgart, Fed. Rep. of Germany

[21] Appl. No.: 780,862

[22] Filed: Oct. 18, 1991

[30] Foreign Application Priority Data

Dec. 12, 1990 [DE] Fed. Rep. of Germany ... 9016786[U]

[51] Int. Cl.[5] .............................................. F21M 3/22
[52] U.S. Cl. ....................................... 362/66; 362/80; 362/427; 33/288; 33/335; 33/370
[58] Field of Search ...................... 362/61, 66, 80, 287, 362/418, 427, 428; 33/288, 335, 365, 370, 379

[56] References Cited

U.S. PATENT DOCUMENTS

| | | | |
|---|---|---|---|
| 1,609,634 | 12/1926 | Ryan | 33/370 |
| 4,802,067 | 1/1988 | Ryder et al. | 33/288 |
| 4,916,583 | 4/1990 | Nagasawa | 362/61 |

Primary Examiner—Richard R. Cole
Attorney, Agent, or Firm—Michael J. Striker

[57] ABSTRACT

The device for testing angular inclination of a headlight (11) has a inclination-detecting device (14) structured as a bubble level connected with the reflector (13) of each headlight and an additional inclination-detecting device (20), which is mounted on the chassis of the motor vehicle. The inclination-detecting device (14) of the headlight indicates the deviation of the reflector (13) from horizontal. The additional inclination-detecting device (20) indicates the inclination of the motor vehicle in a vertical plane (22). To test the inclination or orientation of the reflector from a set value, the reading of the inclinaiton-detecting device (14) is compared with the reading of the additional inclination-detecting device (20). The inclination of the reflector (13) is correct, when, preferably, the inclination-detecting device (14) on the reflector indicates the same deviation from horizontal as the additional inclination-detecting device (20). With the device the inclination of the reflector can also be tested, when the motor vehicle is on a slope.

6 Claims, 1 Drawing Sheet

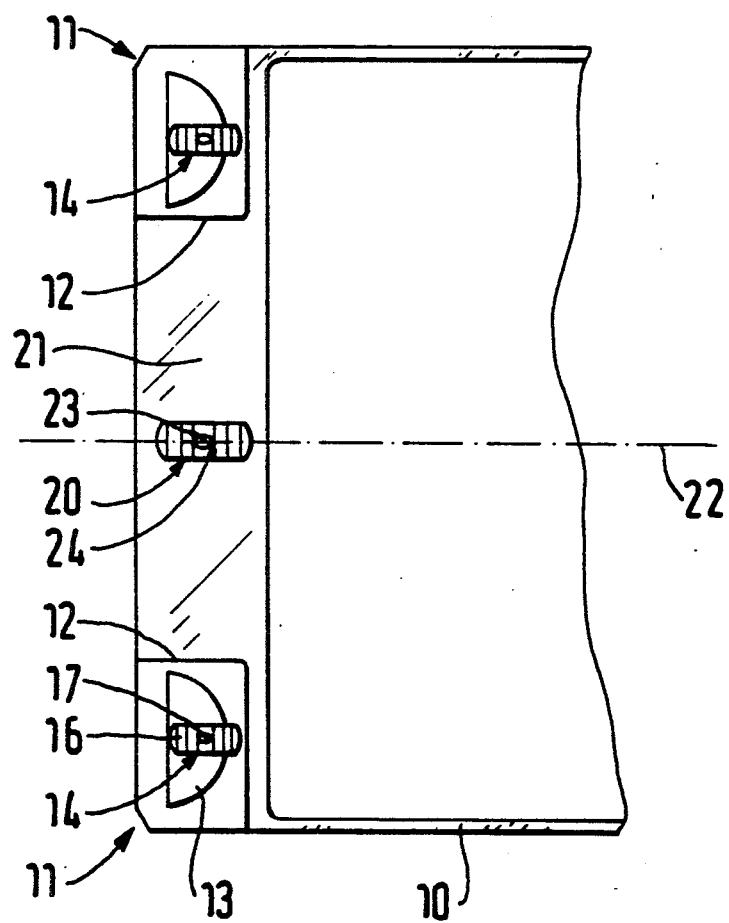

DEVICE FOR TESTING HEADLIGHT ORIENTATION OF A HEADLIGHT OF A MOTOR VEHICLE

BACKGROUND OF THE INVENTION

The present invention relates to a device for testing the headlight orientation of a headlight of a motor vehicle, i.e. the direction in which a light beam produced by the headlights travels, and, more particularly, to a device for testing headlight orientation in the motor vehicle which is standing on an incline or slope.

A headlight aiming and leveling device is described in U.S. Pat. No. 4,802,067. This device has an inclination-detecting device in the form of a bubble level located in the headlights. The inclination-detecting device indicates the variation of the inclination of the headlight from a set value of headlight angular orientation. The light beam emitted by the headlight must often satisfies certain legal requirements regarding the beam direction. The bubble level has a high resolution allowing the exact adjustment of the inclination of the headlight. This means that the air bubble of the bubble level moves over a comparatively large path, when comparatively small inclination changes of the headlight occur. Only a comparatively small variation of angular inclinations of the headlight can be read off the bubble level. This small reading range can only be used, when the motor vehicle stands on an exact horizontal position, since otherwise the suitable angular position of the headlight relative to the road surface can not be determined.

SUMMARY OF THE INVENTION

It is an object of the present invention to provide a device for testing the headlight orientation in a motor vehicle, particularly when the motor vehicle is standing on a slope or incline.

These objects, and others which will be made more apparent hereinafter, are attained in a device for testing the headlight alignment or orientation of a headlight mounted in a motor vehicle, advantageously on the chassis of the motor vehicle, having a inclination-detecting device, preferably a bubble level, associated with the headlight, so that the inclination-detecting device reads an angular deviation of the headlight from horizontal(and, when the motor vehicle is horizontal, from a set value of angular orientation).

According to the present invention, the device also comprises an additional inclination-detecting device, preferably another bubble level, mounted on the chassis of the motor vehicle. This additional inclination-detecting device indicates an angular inclination of the motor vehicle from horizontal in the vertical longitudinal plane of the motor vehicle.

With the device according to the invention, it is also possible to test the adjustment of the headlights in the motor vehicle with the aid of the additional inclination-detecting device, when the motor vehicle is not exactly horizontally orientated, i.e. when the motor vehicle is on a slope or an incline. A comparison of the reading of the inclination-detecting device of the headlight with the reading of the additional inclination-detecting device gives the inclination of the headlight from the set value of headlight inclination.

In one embodiment of the invention, when the motor vehicle has two headlights, the additional inclination-detecting device can be mounted on a transverse support member of the chassis extending between the headlights.

Advantageously, the additional inclination-detecting device is located on the chassis near the headlight. It is particularly easy to compare the readings of the additional inclination-detecting device on the chassis and the inclination-detecting device in the headlight.

The inclination-detecting devices are both advantageously bubble levels, each comprising a transparent tube containing a liquid, usually water, with an air bubble in the liquid. The transparent tube has markings or graduations to show the position of the air bubble. When the air bubble is exactly between two central markings, then the inclination-detecting device is exactly horizontal.

A comparison between the readings of the inclination-detecting device attached to the reflector of the headlight and the additional inclination-detecting device attached to the chassis is made most easily, when, preferably, the two devices have the same resolution, and, more preferably, when the two devices are identical.

BRIEF DESCRIPTION OF THE DRAWING

The objects, features and advantages of the present invention will now be illustrated in more detail by the following detailed description, reference being made to the accompanying drawing in which:

The sole figure is a diagrammatic top plan view of an apparatus for testing the inclination setting of the headlights of a motor vehicle in the motor vehicle.

DETAILED DESCRIPTION OF THE PREFERRED EMBODIMENTS

In the example shown in the drawing, two headlights 11 are built into the front end portion of the chassis 10 of a motor vehicle. Each headlight 11 is constructed as a headlight-containing housing unit, with a reflector 13 mounted inside a housing 12. The reflector 13 is pivotable by an unshown adjusting mechanism to provide a lateral adjustment and an inclination adjustment.

A device for monitoring the inclination setting of the headlight 11 has an inclination monitoring means connected with the reflector 13 of the headlight in the form of a inclination-detecting device 14. Several linear markings 16 are present on the inclination-detecting device 14. The inclination-detecting device 14 is in this embodiment a bubble level. The position of an air bubble 17 in the inclination-detecting device relative to the markings 16 indicates the inclination of the reflector 13. The inclination-detecting device 14 can be adjustably mounted in a recess in the reflector 13. In its adjusted final position, the inclination-detecting device 14 is oriented in the inclination-detecting device 14 so that the inclination of the reflector 13 is correctly adjusted, when the air bubble 17, as shown in the Figure, is found between both central linear markings 16. In this way variations of the inclination of the reflector 13 both in the sense of a movement to higher angular orientation and also in the sense of a movement to lower angular orientation can be read off the inclination-detecting device 14. The inclination-detecting device 14 has, for example, an indicating range of variation of the inclination of the reflector of 1.2°. The inclination-detecting device 14 is thus structured, so that the air bubble 17 moves a comparatively large distance, when there is a comparatively small change in headlight inclination.

The inclination-detecting device 14 can measure angular inclination with a high resolution as well. Thus the angular inclination of the reflector 13 can be very accurately determined.

The apparatus has an additional inclination-detecting device 20 attached to the chassis 10 of the motor vehicle, which is similarly in the form of a bubble level. The additional inclination-detecting device 20 can be mounted on a transverse support member 21 of the chassis 10 extending between the headlights 11, so that it is easily readable with the motor hood open to test the adjustment of the headlight. The additional inclination-detecting device 20 is arranged so that it indicates the inclination of the motor vehicle in a vertical longitudinal plane 22 of the motor vehicle. The additional inclination-detecting device 20 can advantageously be constructed identical to the above-mentioned inclination-detecting device 14 of the headlight 11, so that a special manufacturing effort is not necessary. The additional inclination-detecting device 20 is adjustable relative to the chassis 10 of the motor vehicle and so aligned in its adjusted final position that, when the motor vehicle is exactly horizontal, the air bubble 23 in the longitudinal plane 22 is located between both the central markings 24. The inclination-detecting device 20 can read deviations of the angular inclination of the motor vehicle of ±1.2° from a horizontal orientation of the motor vehicle.

If the motor vehicle stands in an exactly horizontal position during the monitoring of the angular inclination of the reflector 13, the deviation of the inclination of the reflector can be read directly from the inclination-detecting device 14 on the reflector 13. Whether the motor vehicle is aligned in the horizontal position in the longitudinal plane 22, can be determined from the additional inclination-detecting device 20, whose air bubble 23 then stands between both central markings 24. The inclination of the reflector 13 is then correctly set, when the air bubble 17 of the inclination-detecting device 14 is located between both central markings 16.

However if the motor vehicle is standing on an inclined plane or slope, the additional inclination-detecting device 20 indicates the inclination of the motor vehicle in the vertical longitudinal plane 22 from a true horizontal orientation. To determine, whether the inclination of the reflector is correctly adjusted, the reading of the inclination-detecting device 14 on the reflector 13 must be compared with the reading of the additional inclination-detecting device 20. The inclination of the reflector 13 is correctly adjusted, when the air bubble 17 of the inclination-detecting device 14 of the reflector 13 indicates the same inclination relative to the central markings 16, as the additional inclination-detecting device 20 on the support beam 21, which shows the inclination of the vehicle from the horizontal. For example, if the additional inclination-detecting device 20 indicates an inclination of the motor vehicle in the vertical longitudinal plane 22 of +1.2°, thus the inclination of the reflector 13 is correct, when its bubble level indicates an inclination of +1.2°. If the inclination-detecting device 14 of the reflector 13 is constructed identically with the additional inclination-detecting device 20, a rapid comparative reading of the additional inclination-detecting device 20 to the inclination-detecting device 14 is possible. If the inclination-detecting device 14 of the reflector 13 indicates an inclination which varies from the correct inclination, the reflector 13 of the headlight can be pivoted by an unshown adjusting mechanism into the required orientation, until the inclination-detecting device 14 shows the same inclination as the additional inclination-detecting device 20.

The inclination-detecting device of the headlight and the additional inclination-detecting device can be constructed also as a pendulum balance in other embodiments of the invention. A pendulum arm indicates the inclination of the headlight and/or the inclination of the motor vehicle relative to a scale with a number of divisions.

It will be understood that each of the elements described above, or two or more together, may also find a useful application in other types of structures differing from the types described above.

While the invention has been illustrated and described as embodied in a device for testing motor vehicle headlight orientation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. In a device for testing angular inclination of a headlight (11) mounted in a motor vehicle having a chassis (10) and a vertical longitudinal plane (22), said device comprising an inclination-detecting device (14) associated with the headlight (11) so that said inclination-detecting device (14) reads an angular deviation of the headlight from horizontal, the improvement comprising an additional inclination-detecting device (20) mounted on the chassis (10) of the motor vehicle, said additional inclination-detecting device (20) indicating an angular inclination of the motor vehicle from horizontal in the vertical longitudinal plane (22) of the motor vehicle.

2. The improvement as defined in claim 1, wherein the additional inclination-detecting device (20) is located in the vicinity of the headlight (11).

3. The improvement as defined in claim 2, wherein the motor vehicle has two of said headlights and the additional inclination-detecting device (20) is mounted on a transverse support member (21) of the chassis extending between the headlights (11).

4. The improvement as defined in claim 1, wherein both the inclination-detecting device (14) associated with the headlight and the additional inclination-detecting device (20) are bubble levels.

5. The improvement as defined in claim 1, wherein the inclination-detecting device (14) associated with the headlight has a resolution equal to that of the additional inclination-detecting device (20).

6. The improvement as defined in claim 1, wherein the inclination-detecting device (14) and the additional inclination-detecting device (20) are similar type devices.

* * * * *